Aug. 9, 1927.  
H. W. JEANNIN  
ELECTRIC MOTOR  
Filed May 11, 1925  
1,638,531  
2 Sheets-Sheet 1
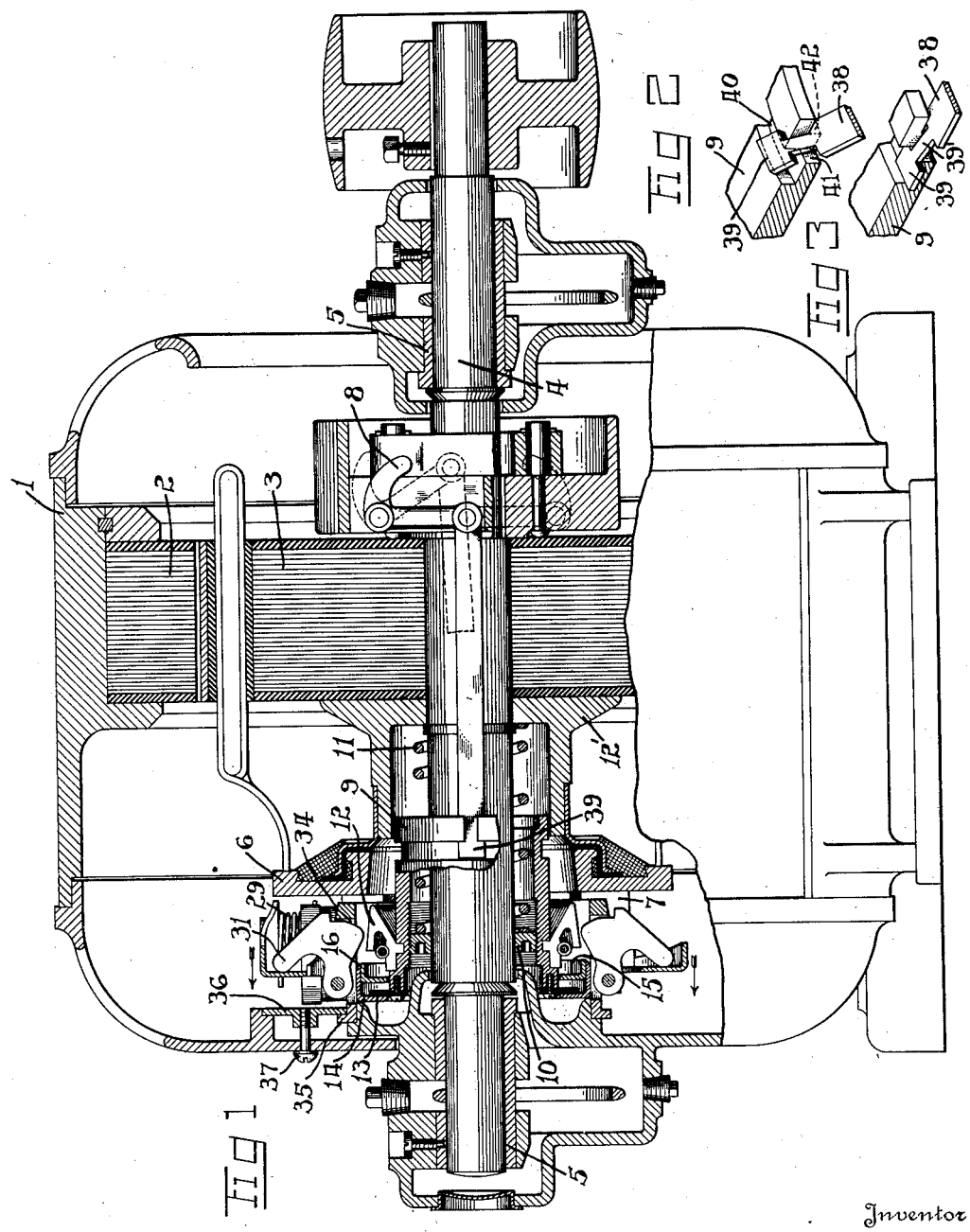
Inventor  
Harry W. Jeannin  
By Owen, Owen & Crampton  
Attorneys

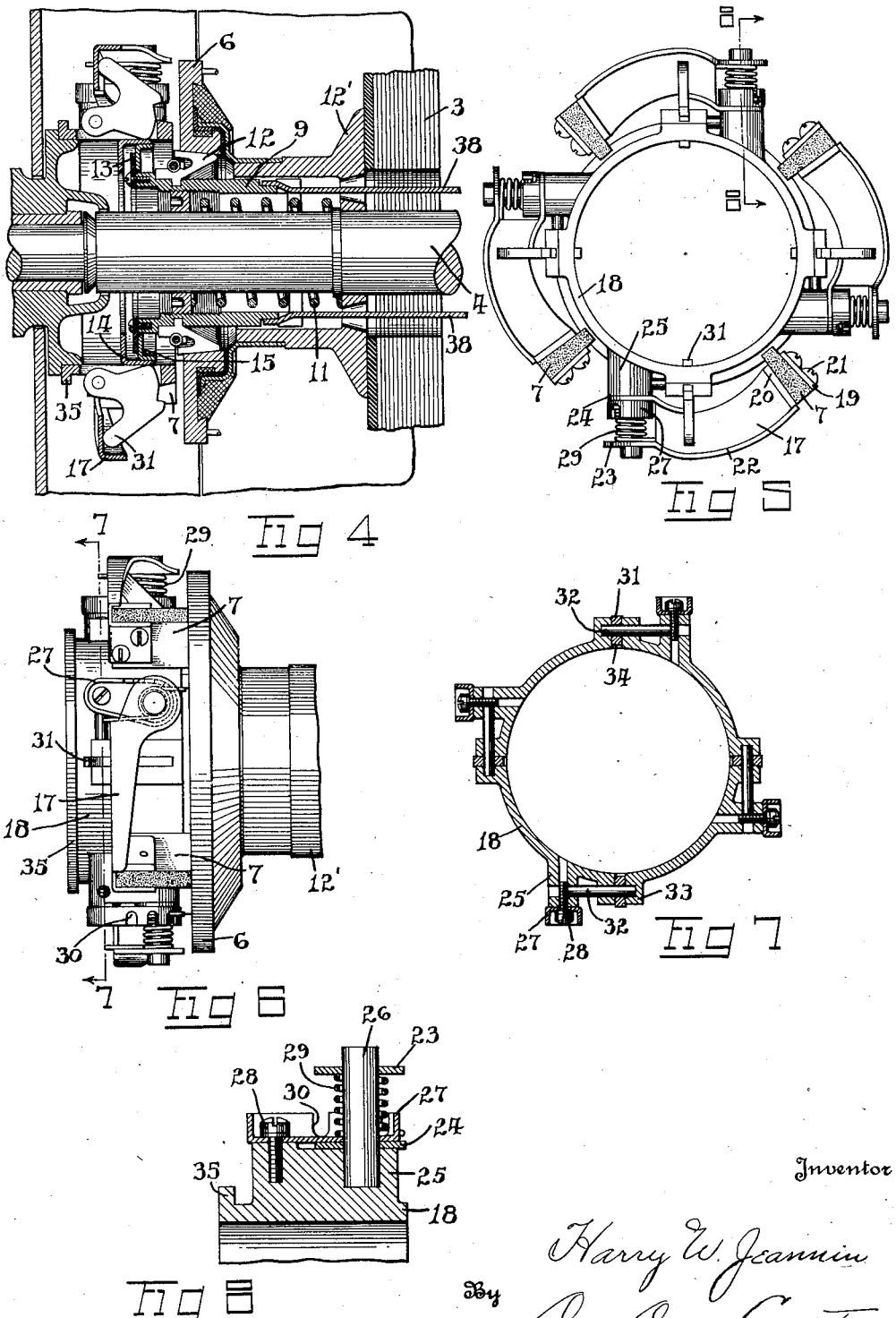

Patented Aug. 9, 1927.

1,638,531

UNITED STATES PATENT OFFICE.

HARRY W. JEANNIN, OF TOLEDO, OHIO, ASSIGNOR TO THE JEANNIN ELECTRIC COMPANY, OF TOLEDO, OHIO, A CORPORATION OF OHIO.

ELECTRIC MOTOR.

Application filed May 11, 1925. Serial No. 29,295.

This invention relates to electric motors and particularly to alternating current motors of the repulsion-induction type, in which in the starting of the motor the brushes are in contact with the commutator and after the motor speed reaches a predetermined point the brushes are moved from the commutator by a governor operated or controlled device.

Objects of this invention are to provide a new and improved brush-holding arrangement and actuating mechanism whereby the brushes are positively moved out of contact with the commutator in the unique manner hereinafter described; to provide an improved mounting for the brush-holding arm in which a single element is employed to hold the several parts in place; to provide a connector for joining the governor device and movable sleeve which requires no bolts, screws, etc., and may be readily assembled and disassembled; and to provide an electric motor having the new and improved features of construction and arrangement hereinafter more clearly pointed out.

An embodiment of the invention is shown by way of illustration in the accompanying drawings, in which,—

Fig. 1 is a longitudinal section of an electric motor embodying this invention showing the parts in starting position; Figs. 2 and 3 are fragmentary perspective views showing the manner in which the governor arm is connected to the movable sleeve; Fig. 4 is a longitudinal section showing the relative position of the parts after the motor has attained operating speed; Fig. 5 is an end elevation of the mounting and brush arms; Fig. 6 is a side elevation of the brush mounting showing the brushes in contact with the commutator; Fig. 7 is a transverse section on the line 7—7 of Fig. 6; and Fig. 8 is a section on the line 8—8 of Fig. 5.

The electric motor illustrated is in many respects similar both in construction and operation to the motor shown and described in my prior Patent No. 1,474,037, granted November 13, 1923, and this invention consists in certain novel features as will hereinafter be described. It is deemed unnecessary here to enter into a detailed description of the motor construction and operation, but in order clearly to understand the invention a general description will be considered sufficient.

On the drawings, the frame 1 carries the stator or field element 2 adjacent to which is positioned the rotor or armature element 3 rotatable on the motor shaft 4, which is supported in bearings 5 at opposite ends thereof. Concentric with the shaft 4 is the commutator 6 with which the brushes 7 are adapted to contact, and mounted on the shaft 4 on the opposite side of the armature 3 is a governor or speed responsive device 8, which is connected to the shaft and movable in accordance with the speed thereof to throw the brushes 7 out of contact with the face of the commutator 6.

The armature 3 is made up of relatively high resistance winding and this winding is employed for starting the motor on the repulsion principle through the agency of the commutator 6 and brushes 7, as well understood in the art. After the motor has attained a predetermined maximum or desired speed, the speed responsive or governor device 8 automatically operates positively to shift the brushes 7 away from the commutator, and converting the high resistance winding into low resistance winding by changing from a number of windings in series to a paralleling of the turns, so that thereafter the motor operates on the induction principle.

Referring more particularly to the drawings, a sleeve 9 surrounds the shaft 4 and is internally screw-threaded to receive an adjusting ring 10 against which bears a coil spring 11, the opposite end of which bears against the end member 12' of the armature.

Carried on the outer side of the sleeve 9 is a short circuiting ring 12, which is adapted to be moved into engagement with the commutator 6, the detail construction, arrangement and operation of the ring 12 being fully set forth in my above mentioned patent.

Secured to the outer end of the sleeve 9, as by screws, is a ring 13 which projects beyond the outer periphery thereof, and enclosing the ring 13 is a cam actuating member which consists of an outer cup-shaped member 14 and an inner ring 15, which may be suitably secured to the inner surface of the member 14. The member 14 is spaced a slight distance from the ring 15 and the sleeve ring 13 lies in the space therebetween. The inner edge of the member 14 and ring 15 are beveled at 16 for a purpose hereinafter described.

As most clearly indicated in Fig. 5, the brushes 7 are secured to arms 17 which are connected to a ring mounting 18 of aluminum or other suitable material. The arms 17 extend circularly around the mounting 18 in a direction substantially transverse to the axis of the shaft 4 and the brushes 7 project at right angles from the arms 17 in the direction of the commutator 6. It frequently happens that the brushes 7 vary in conformation and in order to allow for such variance and securely to hold the brushes in place, the arms 17 are formed with integral end plates 19 extending at approximately right angles from the arms and loosely connected to the arms 17 are clamping plates 20, which have portions projecting through openings in the arms. By means of screws 21 which extend through the plates 19, brushes 7 and clamping plates 20 the several parts are securely held in place, the plate 20 being movable to compensate for any irregularity in the brush construction.

The brush carrying arm 17 is formed with a web 22 which forms a fork 23 at one end of the arm, and spaced from the fork 23 is a fork 24. For pivoting the arm 17 to the mounting 18, a boss 25 on the outer side of the mounting carries a pivot post 26 which extends through holes in the forks 23 and 24. The arm 17 is held against the boss 25 by means of a cup shaped washer 27 which fits over the post 26 and bears against the upper surface of the fork 24, and extending through the opposite end of the washer 27 is a screw 28 which fastens the arm to the boss 25.

The arm 17 is normally held outwardly in position to engage the commutator 6 by means of a coil-spring 29 which surrounds the post 26 and has one end bearing against the arm, the opposite end thereof being disposed in one of the notches 30 formed in the upstanding edge of the washer 27. In this manner the tension of the spring 29 may be adjusted by changing one end of the spring from one notch to another.

For moving the arm 17 out of contact with the commutator 6, a bell crank lever or trigger 31 is pivotally mounted on a pin 32 which extends into a lug 33 formed on the mounting 18. The opposite end of the pin 32 is disposed within the boss 28 and is of such length that the screw 28 when threaded into position blocks its removal. It will thus be seen that the single screw 28 not only serves to fasten the washer 27 and arm 17 to the mounting 18, but also prevents removal of the pin 32.

One arm of the bell crank 31 engages the inner surface of the arm 17, while the other arm projects through an opening 34 in the mounting 18, as most clearly indicated in Fig. 1. The mounting 18 is provided with a circumferential flange 35 at the outer end thereof against which a plate 36 is adapted to bear and a screw 37 extending through the end plate of the motor frame engages the plate 36 thereby holding the mounting 18 securely in place.

In the operation of the machine so far described it will readily be understood that movement of the sleeve 9 to the right of Fig. 1 causes the sleeve ring 13 to engage the ring 15 and move the beveled edge 16 thereof into engagement with the bell crank lever 31. Further movement to the right of the sleeve 9 actuates the lever 31 in a counter clockwise direction whereupon the brush carrying arm 17 is moved to the left to throw the brush 7 out of contact with the commutator 6. It will be observed that the brush carrying arm 17 is moved automatically and positively in a direction opposite to the movement of the sleeve 9. It will also be apparent that movement of the sleeve 9 is caused by means of the speed responsive device 8 which functions after the motor shaft 4 has reached a predetermined speed. After the speed of the motor has decreased sufficiently for the coil spring 11 to act in opposition to the speed responsive device 8 for returning the sleeve 9 to its normal position, the brush carrying arm 17 is returned to its normal position with the brushes in contact with the commutator 6 by means of the coil spring 29.

The speed responsive device 8 is connected to the sleeve 9 by means of arms 38 which are pivoted at one end to the speed responsive device and at the other end are detachably connected to the sleeve 9. Each arm 38 is provided with an off-set T shaped extension 39, the extreme end of which extends in a plane substantially parallel to the longitudinal plane of the arm. The sleeve 9 is formed with an annular groove 40, a longitudinal slot 41, and an internal annular shoulder 42 and to attach the extension 39 to the sleeve 9, the reduced neck portion 39' of extension 39 is first inserted into the slot 41 with the arm 38 inclined downwardly. Thereafter, by lifting up on the arm 38, the end of the extension 39 is positioned within the groove 40 to lie substantially flush with the outer surface of the sleeve and in this position the inner surface of the arm 38 is approximately coincident with the bore of the sleeve 9. By means of this arrangement the arm 38 may readily be attached to and detached from the sleeve 9 without the use of any tools or the employment of bolts or nuts.

While I have described my improved motor in more or less detail to comply with the requirements of the statute, it is nevertheless desired that this detailed description be considered merely as illustrative and not as limiting, and it is to be understood that changes and modifications may be made by those skilled in this art without departing from the invention as defined in the following claims.

Having thus described my invention, what I claim as new and desire to secure by Letters Patent is:

1. In an electric motor, a motor shaft, a commutator, brushes in contact with said commutator, pivoted brush carrying arms, the axes of whose pivots are mounted in planes at right angles to the axis of the motor shaft, said arms being disposed in tangential relation to said motor shaft, a speed responsive device, and connections between said speed responsive device and said brush carrying arms for moving said brushes from said commutator after the motor speed has attained a predetermined maximum.

2. In an electric motor, a motor shaft, a commutator, brushes in engagement with said commutator, brush carrying arms, a mounting concentric with said commutator, pivots mounted at right angles to the axis of said motor shaft for connecting the arms to said mounting in tangential relation thereto, means independent of said arms carried by said mounting for moving said arms to retract said brushes from said commutator, and a speed responsive device for actuating said last means.

3. In an electric motor, a mounting having a boss, a brush arm having a forked end, a post projecting from said boss to receive said forked end, a washer on said post between the forks, a spring on said post having one end bearing against said arm and the opposite end anchored to said washer, and a single means for connecting said washer and boss, said means also serving to hold the arm to said boss.

4. In an electric motor, a mounting having a boss, a brush arm having a forked end, a post projecting from said boss to receive said forked end, and a washer on said post between the forks, a spring on said post having one end bearing against said arm and the opposite end anchored to said washer, a cam lever for actuating said arm, a pivot pin for said arm extending substantially parallel to said arm and having one end disposed within said boss, and a single securing element connecting said arm and washer to said boss, said element also serving to block the removal of said pivot pin.

5. In an electric motor, a mounting having a boss, a brush arm having a forked end, a post projecting from said boss to receive said forked end, a cup-shaped washer having a plurality of notches on said post between the forks, a spring on said post having one end bearing against said arm and the opposite end anchored to said washer in one of said notches, thereby to enable the tension of said spring to be adjusted, a cam lever for actuating said arm, a pivot pin for said arm extending substantially parallel to said arm and having one end disposed within said boss, and a single securing element connecting said arm and washer to said boss, said element also serving to block the removal of said pivot pin.

6. In an electric motor, a shaft, a sleeve slidable axially on said shaft having an external groove, an internal shoulder and a longitudinal slot, a device responsive to the speed of said shaft, an arm connecting said device and sleeve, and a T-shaped offset extension on said arm adapted to extend thru said slot with the end thereof seating in said groove, the end of the arm abutting against said internal shoulder and the end of said extension and said arm lying in parallel planes, the neck of said extension being of less width than the end thereof and said arm.

In testimony whereof, I have hereunto signed my name to this specification.

HARRY W. JEANNIN.